United States Patent [19]

Kitamura

[11] Patent Number: 4,777,713
[45] Date of Patent: Oct. 18, 1988

[54] MACHINE TOOL

[75] Inventor: Koichiro Kitamura, Takaoka, Japan

[73] Assignee: Kitamura Machinery Co., Ltd., Japan

[21] Appl. No.: 32,360

[22] Filed: Mar. 31, 1987

[30] Foreign Application Priority Data

Apr. 4, 1986 [JP] Japan .................. 61-76772

[51] Int. Cl.⁴ .................. B23Q 3/157; B23B 11/00
[52] U.S. Cl. .................. 29/568; 29/27 C; 82/2 R
[58] Field of Search .................. 29/27 R, 27 C, 27 A, 29/40, 39, 53, 568, 564, 26 A; 409/221, 220, 231–233, 165, 198, 235; 82/2 R, 2 D, 32, 36 A; 408/238, 239 R

[56] References Cited

U.S. PATENT DOCUMENTS

| Re. 31,288 | 6/1983 | Matsuzaki et al. | 29/27 C |
|---|---|---|---|
| 3,137,207 | 6/1964 | Berthiez | 409/235 |
| 4,404,727 | 9/1983 | Zankle | 29/568 |
| 4,484,387 | 11/1984 | Nachmany | 29/568 |
| 4,571,796 | 2/1986 | Sellner et al. | 29/27 R |

FOREIGN PATENT DOCUMENTS

| 192221 | 8/1986 | European Pat. Off. | 29/27 A |
|---|---|---|---|
| 2504037 | 10/1982 | France | 29/568 |
| 156102 | 9/1982 | Japan | 29/568 |
| 227343 | 12/1984 | Japan | 29/27 R |
| 94201 | 5/1985 | Japan | 29/568 |
| 563220 | 6/1977 | U.S.S.R. | 29/568 |

Primary Examiner—William R. Briggs
Attorney, Agent, or Firm—Ronald P. Kananen

[57] ABSTRACT

A machine tool includes a plurality of tool holders (4, 7, 19, 64) each holding a tool (4a, 7a, 19a, 81), a first spindle (16) having an axis for holding each tool holder, a spindle head (15) for supporting rotatably the first spindle (16), means (17a) for rotating the first spindle (16), relative to the spindle head (15), means (18) for moving the spindle head (15) in a first direction (X) which is in parallel to the axis of the first spindle (16), means (13) for moving the spindle head (15) in a second direction (Z) which is at a right angle to the first direction (X), a chuck (22) for chucking a workpiece (W), a second spindle (21) for holding the chuck (22), the second spindle (21) extending at a right angle to the first spindle (16), a spindle support (20) for supporting rotatably the second spindle (21), means (24) for rotating the second spindle (21) together with the chuck (22), means (25) for indexing the second spindle (21) together with the chuck (22), and means (3) for locking the first spindle (16) so as to prevent the first spindle (16) from rotating whereby the workpiece (W) can be machined, drilled and ditched while the chuck (22) continues to chuck the workpiece (W).

8 Claims, 7 Drawing Sheets

MACHINE TOOL

BACKGROUND OF THE INVENTION

This invention relates to a machine tool having multiple functions.

In a conventional manner, a workpiece such as a rod is machined by a turning machine or lathe and then drilled and/or ditched by a milling machine or other machines. Therefore, if one workpiece is turned, drilled and ditched, at least the turning machine and the milling machine must be used. Thus, the total installation space for the turning machine and the milling machine must be large. In addition, it must be repeated that a workpiece is attached to a turning machine and dettached from it and then attached to a milling machine and then dettached from it. This results in increasing of production costs.

SUMMARY OF THE INVENTION

The object of this invention is to provide a machine tool in which various working operations such as machining, drilling and ditching can be carried out.

According to this invention, a machine tool includes a first spindle to which a tool is attached and a second spindle to which a workpiece is attached. The first spindle and the second spindle are arranged in such a manner that the workpiece can be machined, drilled and ditched by a single machine tool. The first spindle is designed so as to be selected into either a continuous rotation condition or a locked or fixed condition. The second spindle is designed so as to be selected into either a continuous rotation condition or an indexing condition.

In particular, a machine tool includes a plurality of tool holders each holding a tool such as a machining tool, a drill and an end mill, a first spindle having an axis for holdling each tool holder, a spindle head for supporting rotatably the first spindle, means such as a servo motor for rotating the first spindle relative to the spindle head, means such as a servo motor for moving the spindle head in a first direction which is in parallel to the axis of the first spindle, means such as a servo motor for moving the spindle head in a second direction which is at a right angle to the first direction, a chuck for chucking a workpiece, a second spindle for holding the chuck, the second spindle extending at a right angle to the first spindle, a spindle support for supporting rotatably the second spindle, means such as a driving motor for rotating the second spindle together with the chuck, means such as an index motor for indexing the second spindle together with the chuck, and means for locking the first spindle so as to prevent the first spindle from rotating whereby the workpiece can be machined, drilled and ditched while the chuck continues to chuck the workpiece.

BRIEF DESCRIPTION OF THE PREFERRED EMBODIMENT EMBODIMENT

A first spindle 16 can be set in a continuous rotation condition. Also, the first spindle 16 can be locked or fixed to a spindle head 15 by means of a lock pin 3.

A second spindle 21 can be set so as to continuously rotate by means of a driving motor 24. Also, the second spindle 21 can be indexed at a desired angle by means of an indexing motor 25.

A turning or machining tool 19a is attached through a tool holder 19 to the first spindle 16. A workpiece W is attached to the second spindle 21 through a chuck 22.

In a lathing or machining mode, while the second spindle 21 continuously rotates in the direction of the arrow B (FIG. 1), the spindle head 15 moves from a predetermined point P in the direction X and then in the direction of the arrow Z whereby the workpiece W can be machined by the machining tool 19a.

Figure 4:
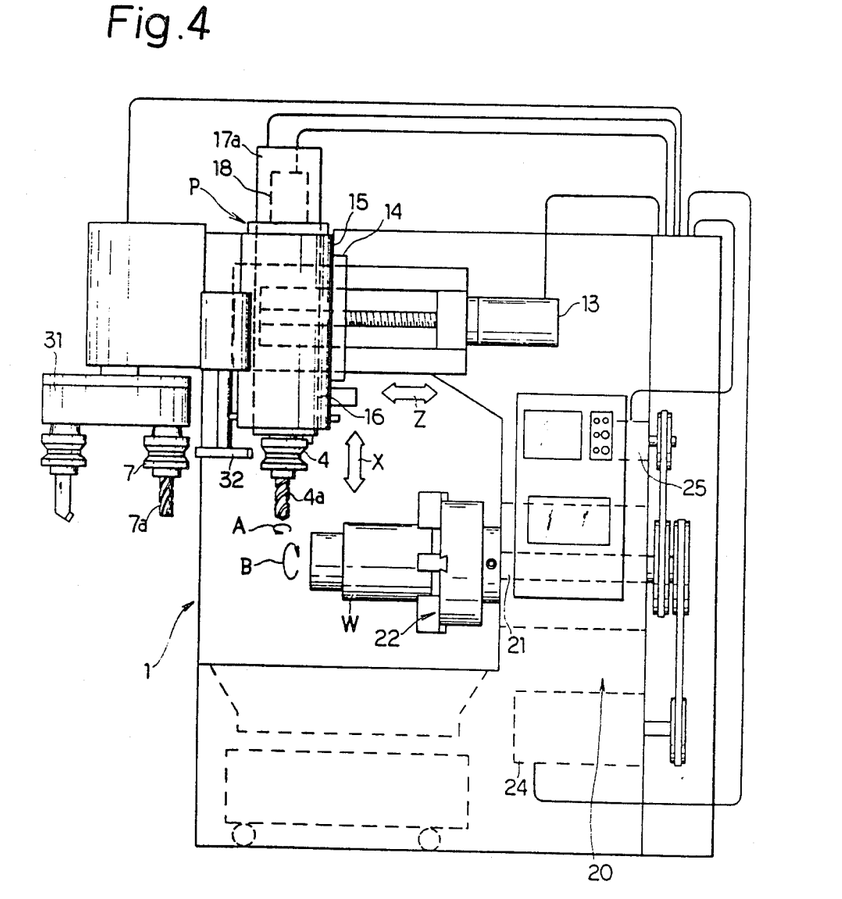
FIG. 4 is a front view showing a machine tool and a drill attached to it according to this invention.
Figure 5:
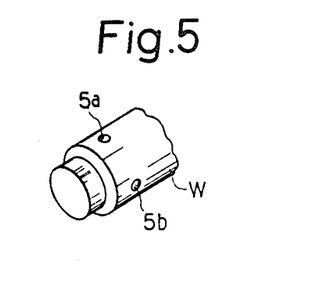
FIG. 5 is a perspective view showing a workpiece which has been drilled by the machine tool according to this invention.
Figure 6:
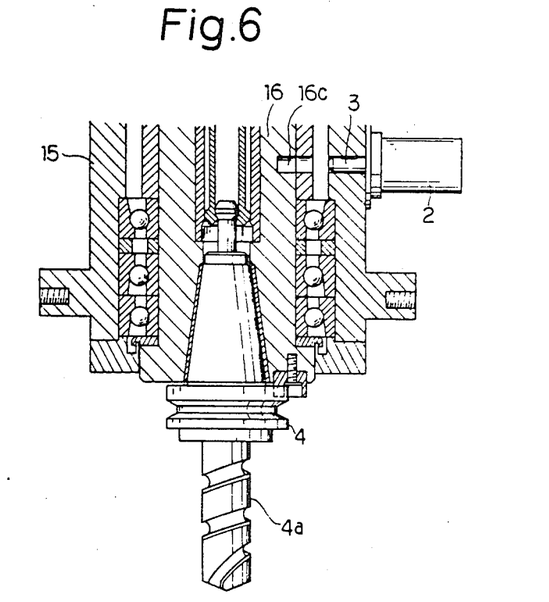
FIG. 6 is a sectional view showing a lower end portion of a spindle used in the machine tool according to this invention.

In a drilling mode, as shown in FIG. 6, the lock pin 3 is withdrawn from a lock hole of the first spindle 16. A drill 4a is attached to the first spindle 16, in place of the machining tool 19a. After that, the first spindle 16 rotates in the direction of the arrow A (FIG. 4). While the workpiece W is in a fixed condition, the spindle head 15 moves from the point P in the direction of the arrow Z and then in the direction of the arrow X so that a blind opening or hole 5a (FIG. 5) can be formed in the workpiece W. After that, the second spindle 21 is indexed in the direction of the arrow B at an angle of 90 degrees. After that, the first spindle 16 rotates in the direction of the arrow A (FIG. 4). While the workpiece W is in a fixed condition, the spindle head 15 moves from the point P in the direction of the arrow Z and then in the direction of the arrow X so that a blind opening or hole 5b (FIG. 5) is formed in the workpiece W.

Figure 7:
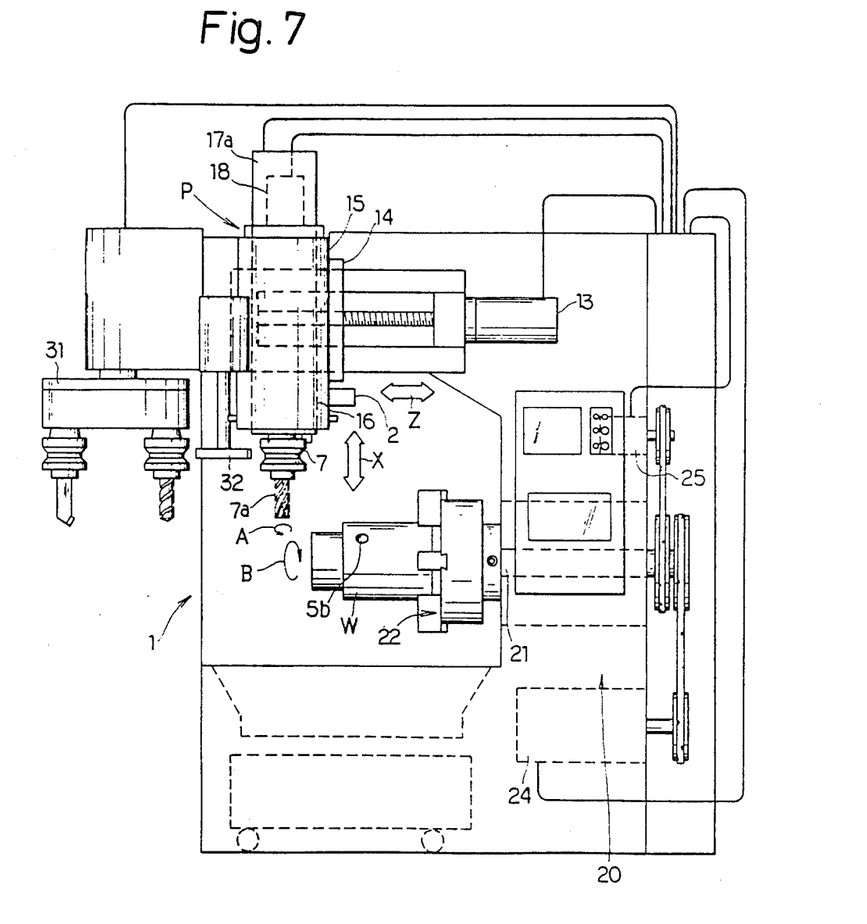
FIG. 7 is a front view showing a machine tool and an end mill attached to it according to this invention.
Figure 8:
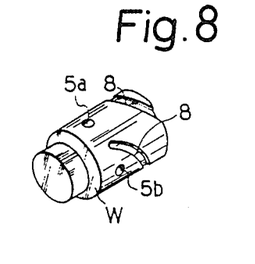
FIG. 8 is a perspective view showing a workpiece in which a cam groove is formed by a machine tool according to this invention.

In a ditching mode, as shown in FIGS. 7 and 8, an end mill 7a is attached to the first spindle 16, in place of the drill 4a. After that, the first spindle 16 rotates continuously in the direction of the arrow A. The second spindle 21 is indexed at an angle of 45 degrees in the direction opposite to the direction of the arrow B. The spindle head 15 moves horizontally from the point P in the direction of the arrow Z and then moves down in the direction of the arrow X to a predetermined point. Further, the spindle head 15 moves horizontally in the direction of the arrow Z while the second spindle 21 rotates at a low speed in the direction of the arrow B whereby a spiral cam groove 8 can be formed in the workpiece W as shown in FIG. 8.

DETAILED DESCRIPTION OF THE EMBODIMENT

Figure 1:
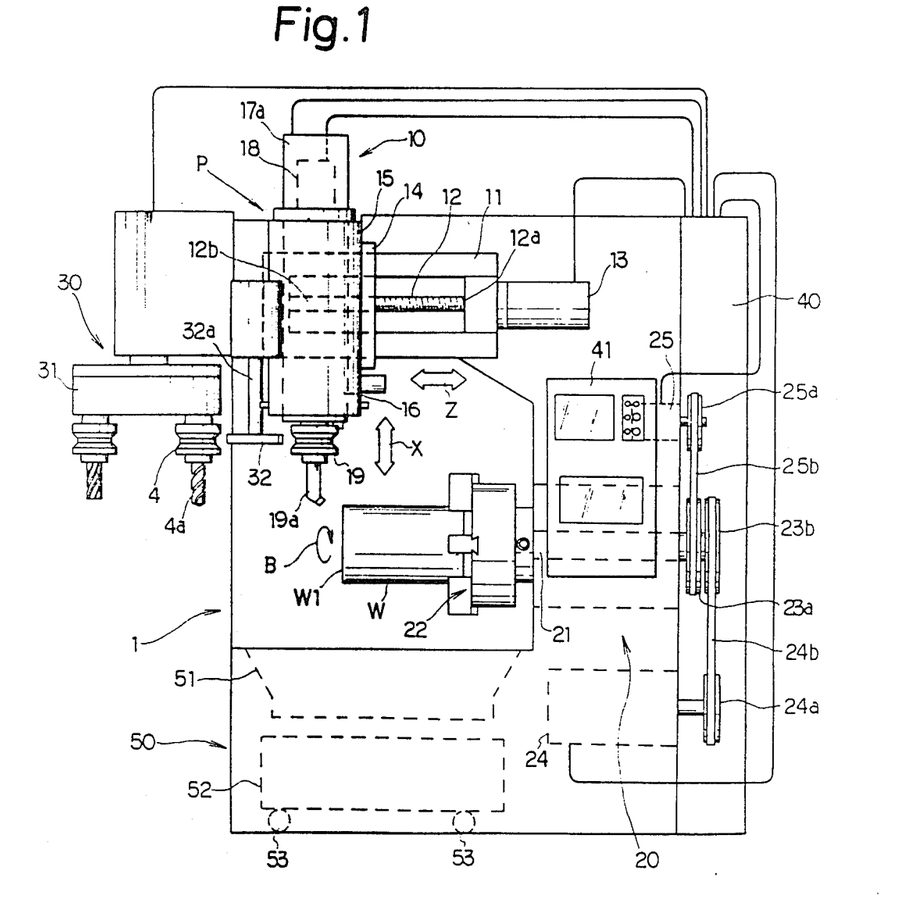
FIG. 1 is a front view showing a machine tool according to a preferred embodiment of this invention.

Referring to FIG. 1, a machine tool 1 has a spindle head unit 10, a spindle support 20, an automatic tool changer 30, a CNC means 40, a CNC operator control panel 41, and a receiver 50 for receiving chips.

The spindle head unit 10 has a frame 11 and a lead screw 12 extending horizontally in the frame 11. One end 12a of the lead screw 12 is joined to an output shaft of a servo motor 13. The other end 12b of the lead screw 12 is rotatably supported by the frame 11. The lead screw 12 is engaged with a base 14 so that, if the servo motor 13 is actuated, the base 14 can move from the point P in the direction of the arrow Z along the lead screw 12.

A spindle head 15 is attached to the base 14. A first spindle 16 is rotatably arranged in the spindle head 15 and extends in the direction of the arrow X. In particular, the first spindle 16 is rotatably supported through a bearing means 17 by the spindle head 15 as shown in FIG. 3.

The first spindle 16 can continuously rotate by means of a main driving motor 17a (FIG. 1) in the direction of the arrow A (FIG. 4). The spindle head 15 can move in the direction of the arrow X by means of a servo motor 18. Although not shown, the servo motor 18 is connected to the spindle head 15 through a lead screw like in case of the lead screw 12.

Figure 3:
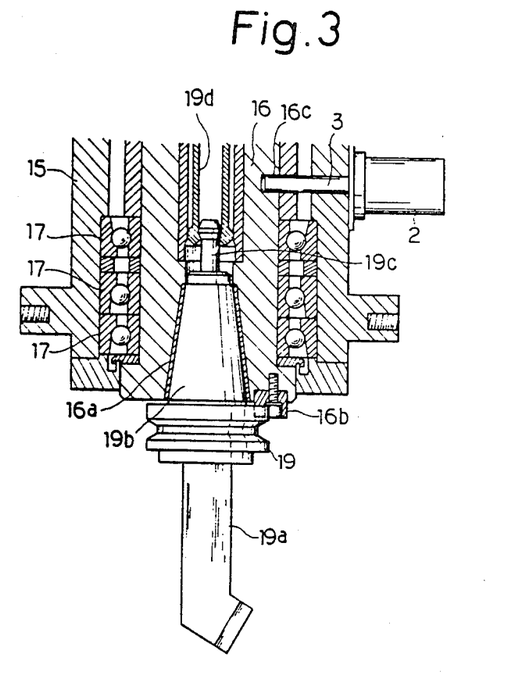
FIG. 3 is a sectional view showing a lower end portion of a spindle head used in the machine tool of FIG. 1.

Referring to FIGS. 1 and 3, a tool holder 19 is detachably attached to a lower end portion of the first spindle 16 as best shown in FIG. 3. The tool holder 19 holds a turning or machining tool 19a. The tool holder 19 has a tapered portion 19b and a pull stud 19c fixed to an end of the taper portion 19b. The pull stud 19c is pulled upwardly by means of a pulling means 19d while the tapered portion 19b engages with a tapered surface 16a of the first spindle 16. If desired, the tool holder 19 is released from the pulling means 19d and the first spindle 16 in a conventional manner. Further, the tool holder 19 can be stopped by the the spindle 16 through a stopper member 16b.

As shown in FIG. 3, a cylinder block 2 is attached to a side surface of the spindle head 15. A lock pin 3 is joined at its end to a piston (not shown) arranged in the cylinder block 2. The lock pin 3 can be inserted into an opening of the spindle head 15 and an opening 16c of the first spindle 16. If the lock pin 3 extends, as shown in FIG. 3, an end portion of the lock pin 3 is inserted into the opening 16c of the first spindle 16 so that the first spindle 16 is locked or fixed relative to the spindle head 15. If the lock pin 3 contracts, as shown in FIG. 6, the lock pin 3 is withdrawn from the opening 16c of the first spindle 16 whereby the first spindle 16 can rotate within the spindle head 15.

Referring again to FIG. 1, the spindle support 20 supports a second spindle 21. A chuck 22 is attached to one end of the second spindle 21. The chuck 22 can be formed of a hydraulic type. The second spindle 21 is arranged so as to extend in a horizontal direction. A workpiece W is attached to the chuck 22. In the shown embodiment, the workpiece W is a cylindrical rod although this invention is not limited to such a workpiece. Two pulleys 23a, 23b are fixed to the other end of the second spindle 21.

A driving motor 24 is arranged under the spindle support 20. An index motor 25 is arranged over the spindle support 20. A pulley 24a is fixed to an output shaft of the driving motor 24. An output shaft of the index motor 25 is equipped with a pulley 25a. A belt 25b is arranged between the pulley 23a and the pulley 25a. A belt 24b is arranged between the pulley 24a and the pulley 23b.

The rotation force of the driving motor 24 is transmitted through the belt 24b to the second spindle 21 so that the second spindle 21 can rotate continuously at a high speed.

The index motor 25 is actuated so that the second spindle 21 can be indexed in the direction of the arrow B (FIG. 1), for example, at an angle of 45 degrees or 90 degrees.

It is preferable that the belts 24b, 25b have teeth.

An automatic tool changer 30 is conventional, having a tool magazine 31 and a tool exchange arm 32. The arm 32 is used to exchange a desired tool holder 4 in the tool magazine 31 and the tool holder 19 attached to a lower end portion of the first spindle 16. The arm 32 first withdraws both the tool holders 4 and 19 at the same time and then turns around a shaft 32a at an angle of 180 degrees and moves up whereby the tool holder 4 is attached to a lower end portion of the first spindle 16 while the tool holder 19 is returned to a predetermined position in the tool magazine 31.

A CNC means 40 is designed so as to control the motor 17a, the servo motor 18, the servo motor 13, the index motor 25, the driving motor 24, the piston in the cylinder block 20 and so on.

A chips-receiver 50 includes a dish 51 for receiving all chips, an opening formed in a bottom portion of the dish 51 and a bucket 52 for containing the chips after receiving them through the opening from the dish 51. Four rollers 53 are arranged at a bottom portion of the bucket 52 so that the bucket 52 is movable.

The continuous operation of the machine tool 1 which includes the turning or machining operation, the drilling operation and the ditching operation in order will be explained. These operations are controlled according to command signals from the CNC means 40.

Figure 2:
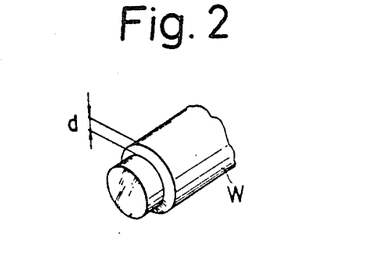
FIG. 2 is a perspective view showing a workpiece which is to be machined by a machine tool according to this invention.

First, the operation of machining or turning a peripheral portion of the workpiece W will be explained with reference to FIGS. 1 to 3.

In a lathing or machining mode, the tool holder 19 is attached to a lower portion of the first spindle 16. As shown in FIG. 3, the lock pin 3 is in an extending condition. The first spindle 16 is thus locked to the spindle head 15 by means of the lock pin 3. The workpiece W is attached to the chuck 22 fixed to the second spindle 21. When the second spindle 21 continuously rotates at a high speed in the direction of the arrow B by means of the driving motor 24, the workpiece W also rotates continuously at the same speed together with the chuck 22.

On the other hand, the servo motor 18 is actuated so that the spindle head 15 moves downwardly from the point P in the direction of the arrow X whereby machining tool 19a moves to a desired point.

The servo motor 13 is actuated so as to move the spindle head 15 toward the workpiece W in the direction of the arrow Z. As a result, as shown in FIG. 2, a peripheral portion of the workpiece W is machined by a depth of d over a predetermined width.

When the machining operation ends, the spindle head 15 moves upwardly in the direction of the arrow X and then in the direction of the arrow Z so that the spindle head 15 returns to the original point P. The machining tool 19 is dettached from the first spindle 16. The second spindle 21 stops.

If desired, an end surface $W_1$ of the workpiece W is machined by the machining tool 19a. In such a case, the machining tool 19a is set so as to face the end surface $W_1$ and then cut it like in case of the peripheral portion of the workpiece W.

The operation of drilling the workpiece W will be explained.

In a drilling mode, referring to FIGS. 4 to 6, the lock pin 3 is actuated to contract so that the first spindle 16 can rotate. After that, the arm 32 is actuated to exchange the tool holder 19 and a desired tool holder 4 having a drill 4a in the tool magazine 31. The tool holder 4 is attached to a lower end portion of the first spindle 16 as shown in FIGS. 4 and 6.

First, the spindle head 15 moves horizontally from the point P in the direction Z. The drill 4a rotates in the direction A by means of the main motor 17a through the tool holder 4, the first spindle 16. The spindle head 15 moves down in the direction X so that an opening 5a can be formed in the workpiece W as shown in FIG. 5.

The spindle head 15 moves up in the direction X so that the drill 4a departs from the workpiece W. After that, the index motor 25 is actuated to index the second spindle 21 at an angle of 90 degrees in the direction of the arrow B. The spindle head 15 again moves down in the direction X so that an opening 5b is formed in the workpiece W as shown in FIG. 5.

After that, the spindle head 15 moves up in the direction X and then in the direction Z so that the spindle head 15 returns to the original point P. The drill 4a stops rotating.

The operation of ditching the workpiece W will be explained.

In a ditching mode, the index motor 25 is actuated so as to index the second spindle 21 in the direction opposite to the direction B at an angle of 45 degrees. The arm 32 is actuated so as to exchange the tool holder 4 and a desired tool holder 7 in the tool magazine 31. As shown in FIG. 7, the tool holder 7 is attached to a lower end portion of the spindle 16. The tool holder 7 is equipped with an end mill 7a.

While the end mill 7a rotates, the spindle head 15 moves horizontally in the direction of the arrow Z and then moves down in the direction of the arrow X. The spindle head 15 moves in the direction Z while the workpiece W rotates in the direction B at a low speed. As a result, a spiral cam groove 8 is formed in a peripheral portion of the workpiece W by means of the end mill 7a as shown in FIG. 8.

After that, the spindle head 15 moves up in the direction X. The end mill 7a stops rotating. The spindle head 15 further moves in the direction Z so that the spindle head returns to the original point P. The second spindle 21 stops rotating.

The operation of forming a blind opening 9 in an end surface $W_3$ of the workpiece 2 will be explained with reference to FIGS. 9 to 11.

In a further drilling mode, an angular head 60 is attached to a lower end portion of the first spindle 16, in place of the tool holder 7. As best shown in FIG. 11, an upper portion of a housing 61 of the angular head 60 is attached to an attached portion 62 of the spindle head 15 through bolts 63. A holder 64 is attached dettachably to a lower end portion of the first spindle 16 as shown in FIG. 3. The holder 64 is fixed to a shaft 65 having a gear 66 which engages a gear 67. The gear 67 is fixed to one end of a shaft 68. A gear 69 is fixed to the other end of the shaft 68 and engages a gear 70 attached to one end of a shaft 71. A tool holder 80 is dettachably attached to the other end of the shaft 71. A drill 81 is attached to the tool holder 80.

Figure 9:
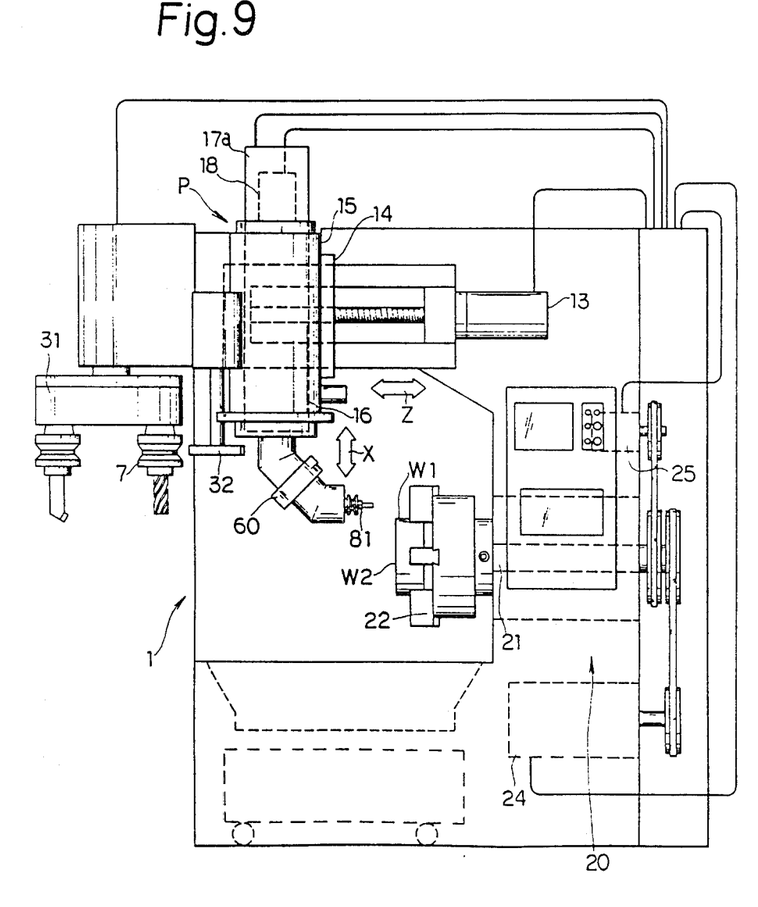
FIG. 9 is a front view showing a machine tool and an angular head attached to it according to this invention.

In FIG. 9, the spindle head 15 moves down from the point P in the direction X until the drill 81 faces the end surface $W_3$ of the workpiece $W_2$. The rotation of the main motor 17a is transmitted by way of the gears 66, 67, 69, 70 to the drill 81. When the spindle head 15 moves toward the workpiece $W_2$ in the direction Z, the opening 9 (FIG. 10) is formed in the end surface $W_3$.

When the drilling operation is finished, the spindle head moves in the direction Z so as to depart from the workpiece $W_2$. The drill 81 stops. The spindle head 15 further moves up in the direction X so that the spindle head 15 returns to the original point P.

Figures 10, 11, 12:
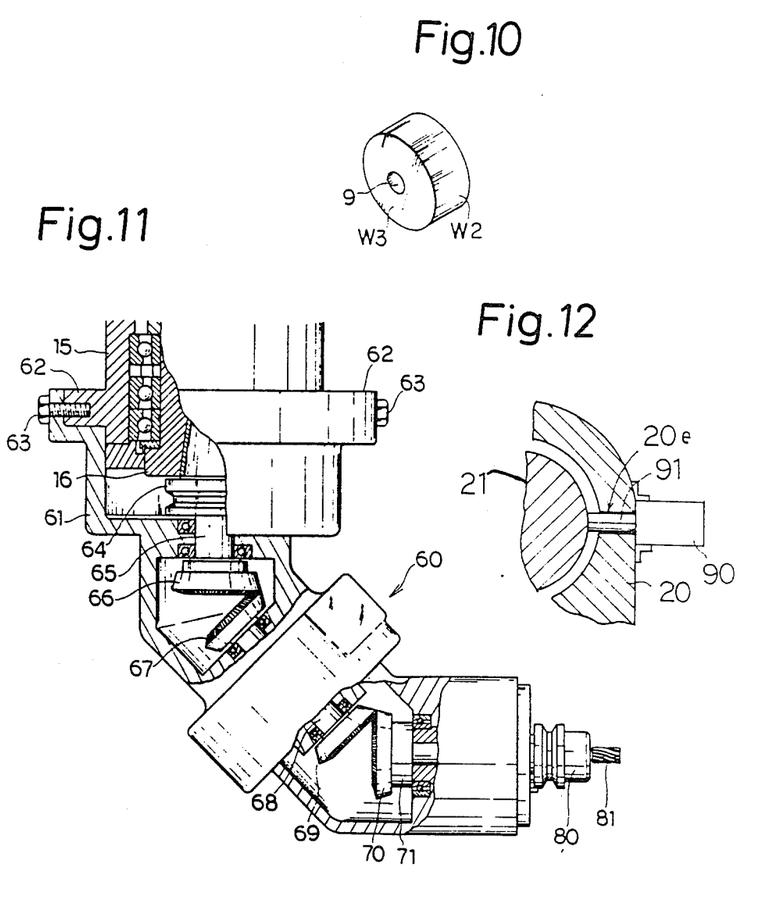
FIG. 10 is a perspective view showing a workpiece in which an opening or hole is formed by a machine tool according to this invention.
FIG. 11 is a front view showing, partly broken, an angular head used in a machine tool according to this invention.
FIG. 12 is a sectional view showing a spindle and a spindle support used in a machine tool according to this invention.

On the other hand, as shown in FIG. 12, the second spindle 21 can be locked to the spindle support 20 by means of a lock pin 91 joined to a piston arranged in a cylinder block 90 if desired. The piston in the cylinder block 90 is controlled by the CNC means 40 (FIG. 1).

When the opening 9 is formed in the workpiece $W_2$, the lock pin 91 is preferably inserted through an opening 20e of the spindle support 20 into an opening of the second spindle 21 so that the second spindle 21 can be surely prevented from rotation. Therefore, the second spindle 21 does not rotate during the drilling operation whereby the opening 9 can be precisely formed.

This invention is not limited to the above stated embodiment only. Although in the illustrated embodiment the spindle head 15 can move in both of the directions X and Z, the spindle head can be designed to additionally move in the direction Y which is at a right angle to both the direction X and the directionn Z. The spindle head 15 can be locked while the spindle support 20 can be moved in the directions X and Z.

The spindle head 15 can be inclined with respect to a vertical line. The chuck 22 can be formed in an air compression type, a mechanical type and any other type.

The first spindle 16 can be designed so as to extend in a horizontal direction while the second spindle 21 can be designed so as to extend in a vertical direction.

The first spindle 16 can be locked by an electromagnetic stopper or a hydraulic stopper. In a similar manner, the second spindle 21 can be locked by an electromagnetic or hydraulic stopper if desired.

Also, the first spindle 16 can be locked by locking an output shaft of the main motor 17a to a desired means. In a similar way, the output shaft of the driving motor 24 can be locked by a stopper whereby the second spindle 21 can be locked if desired.

The second spindle 21 can be designed so as to continuously rotate and be indexed only by means of the driving motor 24. In this case, the index motor 25 can be omitted.

Although not shown, it is preferable that the workpiece W can be automatically attached to the chuck 22 by means of an automatic loader.

A machine tool according to this invention can be applied to not only the turning or machining, drilling and ditching operations but also other operations of forming screws or knurled components.

Incidentally, as shown in FIG. 1, the chips-receiver 51 receives all chips in order to avoid any chips trouble. The chips are introduced through the receiver 51 into the bucket 52. The bucket 52 can be withdrawn from the machine tool 1 by an operator or an automatic withdrawing means.

What is claimed is:

1. A machine tool comprising:
   a plurality of tool holders (4, 7, 19, 64) each holding a tool (4a, 7a, 19a, 81);
   a first spindle (16) having an axis for holding each tool holder;
   a spindle head (15) for supporting rotatably the first spindle (16);
   means (17a) for rotating the first spindle (16) relative to the spindle head (15);
   means (18) for moving the spindle head (15) in a first direction (X) which is in parallel to the axis of the first spindle (16);
   means (13) for moving the spindle head (15) in a second direction (Z) which is at a right angle to the first direction (X);
   a chuck (22) for chucking a workpiece (W);
   a second spindle (21) for holding the chuck (22), the second spindle (21) extending at a right angle to the first spindle (16);
   a spindle support (20) for supporting rotatably the second spindle (21);
   means (24) for rotating the second spindle (21) together with the chuck (22);
   means (25) for indexing the second spindle (21) together with the chuck (22);
   a first lock pin means (3), including a first lock pin, for locking the first spindle (16) so as to prevent the first spindle (16) from rotating;
   the spindle head (15) having an opening into which the first lock pin (3) can be inserted;
   the first spindle (16) having an opening (16c) into which an end portion of the first lock pin (3) can be inserted;
   means (2) for moving the first lock pin (3) through the opening of the spindle head (15) and the opening (16c) of the first spindle (16); and
   a second lock pin (91) for locking the second spindle (21);
   the spindle support (20) having an opening into which the second lock pin (91) can be inserted so as to contact the second spindle (21) so that the latter (21) can be prevented from rotation.

2. A machine tool as defined in claim 1, further comprising a tool magazine (31) in which the tool holders (4, 7, 19, 64) are placed in a predetermined order and an automatic tool changer (30) for exchanging the tool holders (4, 7, 19, 64) between the tool magazine (31) and the first spindle (16).

3. A machine tool as defined in claim 1, wherein the first spindle (16) is arranged so as to extend in a vertical direction and the second spindle (21) is designed so as to extend in a horizontal direction.

4. A machine tool as defined in claim 1, wherein the second lock pin (91) is actuated by a cylinder means (90).

5. A machine tool as defined in claim 1, wherein the moving means (2) is a cylinder means (2).

6. A machine tool as defined in claim 1, wherein the moving-means (2) is an electromagnetic means.

7. A machine tool as defined in claim 1, wherein the spindle head (15) is attached to a base (14) which a lead screw (12) engages with so that the base (14) can move in the second direction (Z).

8. A machine tool comprising:
   a first spindle (16) rotatably supported (17a) by a spindle head (15) and movable in a first direction (X) parallel to an axis of the first spindle (16), said first spindle (16) including means for holding a tool holder (4, 7, 19, 64) for a tool (4a, 7a, 19a, 64a);
   means (13) for moving the spindle head (15) in a second direction orthongonal to said first direction (X);
   a second spindle (21) rotatably supported by a spindle support (20) for holding a chuck (22) for chucking a workpiece (W), said second spindle (21) extending orthogonally to said first spindle (16);
   means (24) for rotating said second spindle (21) and said chuck (22); and
   means for coordinating rotation of said first spindle (16) and said second spindle (21), said rotation coordinating means including:
   a first lock pin (3) insertable upon command into an opening in said spindle head (15) to lock said first spindle (16) to prevent said first spindle (16) for rotating and means (2) cooperating with said first lock pin (3) through the opening in said spindle head (18) and an opening (16c) in said first spindle (16);
   a second lock pin (91) for locking upon command the second spindle (21) upon insertion of said second lock pin (91) into an opening in said spindle support (20) to contact the second spindle (21) to prevent said second spindle (21) from rotating; and
   means (90) for actuating said second lock pin.

* * * * *